United States Patent
Helfman et al.

(10) Patent No.: US 8,139,063 B2
(45) Date of Patent: Mar. 20, 2012

(54) RENDERING DATA VISUALIZATION WITH MINIMAL ROUND-OFF ERROR

(75) Inventors: Jonathan Helfman, Half Moon Bay, CA (US); Joseph H. Goldberg, San Carlos, CA (US)

(73) Assignee: Oracle International Corporation, Redwood Shores, CA (US)

(*) Notice: Subject to any disclaimer, the term of this patent is extended or adjusted under 35 U.S.C. 154(b) by 1107 days.

(21) Appl. No.: 11/745,280

(22) Filed: May 7, 2007

(65) Prior Publication Data

US 2008/0278496 A1  Nov. 13, 2008

(51) Int. Cl.
*G06T 11/20* (2006.01)

(52) U.S. Cl. .......................................... 345/440

(58) Field of Classification Search .................. 345/440, 345/669
See application file for complete search history.

(56) References Cited

U.S. PATENT DOCUMENTS

| | | | |
|---|---|---|---|
| 5,555,354 A | 9/1996 | Strasnick et al. | |
| 6,108,006 A | 8/2000 | Hoppe | |
| 6,349,315 B1 | 2/2002 | Sonoyama et al. | |
| 6,496,832 B2 | 12/2002 | Chi et al. | |
| 6,581,068 B1 | 6/2003 | Bensoussan et al. | |
| 6,583,794 B1 | 6/2003 | Wattenberg | |
| 6,628,312 B1 | 9/2003 | Rao et al. | |
| 6,646,652 B2 | 11/2003 | Card et al. | |
| 6,724,403 B1 | 4/2004 | Santoro et al. | |
| 6,812,941 B1 | 11/2004 | Brown et al. | |
| 6,928,436 B2 | 8/2005 | Baudel | |
| 7,027,052 B1 * | 4/2006 | Thorn et al. ................. 345/440 |
| 7,076,742 B1 | 7/2006 | Thorn et al. | |
| 7,250,944 B2 | 7/2007 | Anderson et al. | |
| 7,287,234 B2 | 10/2007 | Leah et al. | |
| 7,346,858 B1 | 3/2008 | Berg et al. | |
| 7,378,969 B2 | 5/2008 | Chan et al. | |
| 7,427,987 B2 | 9/2008 | Uthe | |
| 7,429,987 B2 | 9/2008 | Leah et al. | |

(Continued)

FOREIGN PATENT DOCUMENTS

JP  2005-011043 A  1/2005

OTHER PUBLICATIONS

"IE Boxing." Internet Archive: Wayback Machine. Feb. 6, 2006. Web. May 20, 2010. <http://web.archive.org/web/20060206032530/http://webhost.bridgew.edu/etribou/layouts/exp/ieboxes.html>.*

The Hive Group, "Honeycomb: The Application for Turning Enterprise Data into Actionable Information," downloaded from the Internet: <<http://hivegroup.com/products.html>>, 3 pages total.

(Continued)

*Primary Examiner* — Xiao M. Wu
*Assistant Examiner* — Scott E Sonners
(74) *Attorney, Agent, or Firm* — Kilpatrick Townsend & Stockton LLP

(57) ABSTRACT

Systems and methods in accordance with various embodiments of the present invention provide for the rendering of data visualizations with minimal round-off errors. The data visualization method represents a dataset as graphical elements within a graphical layout area by performing layout of a data value within the dataset on the graphical layout area. The data value is positioned on the graphical layout area by determining a floating point position of the data value. A round-off error is calculated by casting the floating point position to an integer position on the graphical layout area. The round-off error is distributed to one or more subsequent data values that are yet to be positioned on the graphical layout area.

20 Claims, 5 Drawing Sheets

U.S. PATENT DOCUMENTS

| | | | |
|---|---|---|---|
| 7,447,999 | B1 | 11/2008 | Robertson et al. |
| 7,506,274 | B2 | 3/2009 | Zhang et al. |
| 7,509,591 | B1 | 3/2009 | Thorn et al. |
| 7,650,570 | B2 | 1/2010 | Torrens et al. |
| 7,707,517 | B2 | 4/2010 | Bier et al. |
| 2001/0007139 | A1 | 7/2001 | Murray |
| 2002/0046009 | A1 | 4/2002 | Devaquet et al. |
| 2003/0030634 | A1 | 2/2003 | Sang'udi et al. |
| 2003/0052838 | A1 | 3/2003 | Kim et al. |
| 2003/0158846 | A1 | 8/2003 | Ikehata et al. |
| 2003/0214538 | A1 | 11/2003 | Farrington et al. |
| 2003/0237057 | A1 | 12/2003 | Riedl et al. |
| 2004/0076139 | A1 | 4/2004 | Kang-Yeh et al. |
| 2004/0107277 | A1 | 6/2004 | Levesque et al. |
| 2004/0168115 | A1 | 8/2004 | Bauernschmidt et al. |
| 2004/0183800 | A1 | 9/2004 | Peterson |
| 2004/0205535 | A1 | 10/2004 | Newman et al. |
| 2004/0205536 | A1 | 10/2004 | Newman et al. |
| 2004/0212615 | A1 | 10/2004 | Uthe |
| 2004/0225962 | A1* | 11/2004 | Ohashi et al. ............... 715/517 |
| 2004/0236549 | A1 | 11/2004 | Dalton |
| 2004/0263513 | A1 | 12/2004 | Smith et al. |
| 2005/0192930 | A1 | 9/2005 | Hightower et al. |
| 2006/0037019 | A1 | 2/2006 | Austin et al. |
| 2006/0082592 | A1 | 4/2006 | Black-Ziegelbein et al. |
| 2006/0109949 | A1 | 5/2006 | Tkaczyk et al. |
| 2006/0235838 | A1 | 10/2006 | Shan et al. |
| 2006/0248468 | A1 | 11/2006 | Constantine et al. |
| 2007/0011146 | A1 | 1/2007 | Holbrook |
| 2007/0203902 | A1 | 8/2007 | Bauerle et al. |
| 2007/0217689 | A1 | 9/2007 | Yang et al. |
| 2007/0226640 | A1 | 9/2007 | Holbrook et al. |
| 2007/0276228 | A1 | 11/2007 | Vining et al. |
| 2008/0027981 | A1 | 1/2008 | Wahl |
| 2008/0088628 | A1 | 4/2008 | Lu et al. |
| 2008/0231633 | A1 | 9/2008 | Keller et al. |
| 2008/0295038 | A1 | 11/2008 | Helfman et al. |
| 2009/0013270 | A1 | 1/2009 | Helfman et al. |
| 2009/0013271 | A1 | 1/2009 | Helfman et al. |
| 2009/0013281 | A1 | 1/2009 | Helfman et al. |
| 2009/0013287 | A1 | 1/2009 | Helfman et al. |
| 2011/0016432 | A1 | 1/2011 | Helfman |

OTHER PUBLICATIONS

Singh et al., "Enterprise Reporting with Oracle Reports: Reliable, Extensible, and Integrated," Oracle Reports Whitepaper, Aug. 2005, 16 pages total.

Shneiderman, B., "Treemaps for space-constrained visualization of hierarchies," Jun. 17, 2008, at URL:: http://www.cs.umd.edu/hcil/treemap-history/, 12 pages.

Kolatch, E., "CatTrees: Dynamic Visualization of Categorical Data Using Treemaps," May 2001, at URL: http://www.cs.umd.edu/class/spring2001/cmsc838b/Project/Kolatch_Weinstein/index.html, 12 pages.

Non-Final Office Action for U.S. Appl. No. 11/752,915 mailed on Jun. 10, 2010; 10 pages.

Final Office Action for U.S. Appl. No. 11/773,880 mailed on Mar. 10, 2011; 9 pages.

Final Office Action for U.S. Appl. No. 11/773,895 mailed on Mar. 16, 2011; 10 pages.

Final Office Action for U.S. Appl. No. 11/773,908 mailed on Mar. 16, 2011; 8 pages.

Non-Final Office Action for U.S. Appl. No. 11/773,916 mailed on Jun. 8, 2010; 8 pages.

Smartmoney.com, <<webpage>> "Map of the Market", downloaded from the Internet: <http://www.smartmoney.com/marketmap/popupfresh.cfm>>.

Shneiderman, B., "Tree Visualization with Tree-Maps: A 2-D Space Filling Approach," *ACM Transactions on Graphics*, (Jun. 18, 1991), downloaded from the Internet: <<http://hcil.cs.umd.edu/trs/91-03/91-03.html>> 8 pages.

The Hive Group, "Manufacturing Quality Management," downloaded from the Internet: <<www.hivegroup.com/demos/product_mgmnt/product_failure_readlink.html>>.

Office Action mailed on Sep. 17, 2010, in related U.S. Appl. No. 11/773,880.

Office Action mailed on Sep. 17, 2010, in related U.S. Appl. No. 11/773,895.

Office Action mailed on Nov. 23, 2010, in related U.S. Appl. No. 11/773,916.

Office Action mailed on Nov. 24, 2010, in related U.S. Appl. No. 11/752,915.

Office Action mailed on Sep. 17, 2010, in related U.S. Appl. No. 11/773,908.

* cited by examiner

RENDERING DATA VISUALIZATION WITH MINIMAL ROUND-OFF ERROR

CROSS-REFERENCES TO RELATED APPLICATIONS

This application also is related to the following U.S. patent applications, each of which is hereby incorporated herein by reference:

U.S. patent application Ser. No. 11/752,915, filed May 23, 2007, entitled "AUTOMATED TREEMAP GENERATION";

U.S. patent application Ser. No. 11/773,895, filed Jul. 5, 2007, entitled "AGGREGATE LAYOUT FOR DATA VISUALIZATION TECHNIQUES";

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates generally to the visual display of data and, more particularly, to rendering data visualization with minimal round-off error.

2. Description of the Related Art

In an increasingly competitive world, enterprises are constantly in need of business intelligence that empowers the decision makers in the organization to act on the information, and thus impart extra competitive edge to the organization's products and services. Businesses succeed or fail based on their ability to accurately quantify how many leads become orders, identify their most profitable customers, forecast manufacturing capabilities, manage reliable supply chains, and create sales projections, for example.

However, obtaining information on which decision makers can act presents several practical challenges. One such challenge is the massive amount of data available to the enterprise in today's Information Age. Conversion of data to information which can be readily understood is the obstacle. Additionally, enterprises today have data spread over multiple data sources ranging from legacy systems to relational databases and text files. Even if these problems are surmounted, publishing information in a secure and reliable manner remains another concern for enterprises.

Reporting systems with data visualization functionalities can provide users with the capability to convert diverse data into information that can be easily visualized and deciphered to exploit the information and learn more about the business. Data visualization systems typically display ranges of data values as the ratios of sizes and positions of graphical marks or symbols within the area of a larger shape, such as a rectangular graph or chart. For example, scatter plots display ranges of data values in two data dimensions, a horizontal dimension and a vertical dimension, within a rectangle. The data values are displayed as ratios of positions of dots along the dimensions of the rectangle. In another example, treemaps display hierarchical data by using nesting rectangles such that the ratios of the areas of the innermost nested rectangles correspond to the data values within groups at the lowest hierarchical level.

Typical data visualization algorithms use floating point arithmetic to minimize error while determining the size and position of the graphical representation of the data. Essentially, rendering with greater precision corresponds to less error. Calculating positions of graphics with floating point arithmetic is most appropriate when rendering with graphics systems that support floating point coordinates, such as Scalable Vector Graphics (SVG) or Java 2D, an application programming interface for drawing two-dimensional graphics using the Java programming language. However, calculating positions with floating point arithmetic is not appropriate when rendering with graphics systems that only support integer positions, such as an HTML rendering environment. Typical web browsers support the HTML rendering environment.

When graphics positions calculated with floating point arithmetic are rendered at integer positions, round-off error occurs when the fractional value of the floating point arithmetic is truncated into an integer. Round-off error produces irregular gaps in the data visualization. Some data visualization methods render the graphics with floating point arithmetic at integer positions without regard for the round-off error. In these methods, the accuracy of the data representation is highly compromised because of the disregard of the round-off error. Other data visualization methods attempt to minimize round-off error on graphics systems which only support integer positions by necessitating the use of plug-in components which support floating point arithmetic, such as SVG or Java plug-ins. However, other methods of minimizing round-off error without requiring plug-in components are desirable.

BRIEF SUMMARY OF THE INVENTION

Systems and methods in accordance with various embodiments of the present invention provide for the rendering of data visualizations with minimal round-off errors. The effects of round-off error are minimized in a data visualization when rendering floating point coordinates of data values at integer positions in a graphical layout area by distributing the round-off error. More specifically, the data visualization method represents a dataset as graphical elements within a graphical layout area by performing layout of a data value within the dataset on the graphical layout area. The data value is positioned on the graphical layout area by determining a floating point position of the data value. A round-off error is calculated by casting the floating point position to an integer position on the graphical layout area. The round-off error is distributed to one or more subsequent data values that are yet to be positioned on the graphical layout area.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which.

DETAILED DESCRIPTION OF THE INVENTION

Data visualizations which lie on integer positions and minimize the effects of round-off error are useful for rendering to graphics environments which have limited capabilities. In particular, there is no method for drawing graphical forms at fractions of a pixel that works consistently throughout common web browsers. Since critical business decisions may be based on the information portrayed in the data visualization, rounding error should be minimized in order to provide the most accurate graphical representation of data. For example, unintentional differences in the sizes of graphics may be perceived as conveying differences in quantity among the data values. Decisions based on such erroneous representations may be equally erroneous.

One advantage of rendering data visualizations with minimal round-off error is the improvement in the quality of data visualizations. The data visualizations may be adapted to render at integer positions, such as in a web browser, using tags such as standard HTML division ("DIV") tags. The adaptation can be performed using a technique which diffuses round-off error to subsequent data values to be positioned in the layout area. In one embodiment, the rounding error from one data value is propagated to another data value during positioning such that the total error is distributed across the entire visualization. This produces a more informational visualization of data by preventing the accumulation of rounding error towards the later-positioned data values. Moreover, the error associated with the data value may be no more than might be expected if the edges of the visual representation were off by a single pixel.

Another advantage of such a solution is that it can make data visualization accessible to more people. For example, users can employ data visualization techniques when rendered as basic HTML without the need for additional overhead to configure the web browser. Furthermore, vision-challenged users can interpret data visualizations when rendered as basic HTML because conventional screen readers are capable of reading text associated with HTML DIV elements.

In the description that follows, various embodiments will be described in reference to subsystems on a platform for a software application, such as a database application. However, embodiments are not limited to any particular architecture, environment, application, or implementation. For example, although various embodiments will be described in reference to database applications, aspects may be advantageously applied to any appropriate application. Therefore, the description of the embodiments that follows is for purposes of illustration and not limitation.

Figure 1:
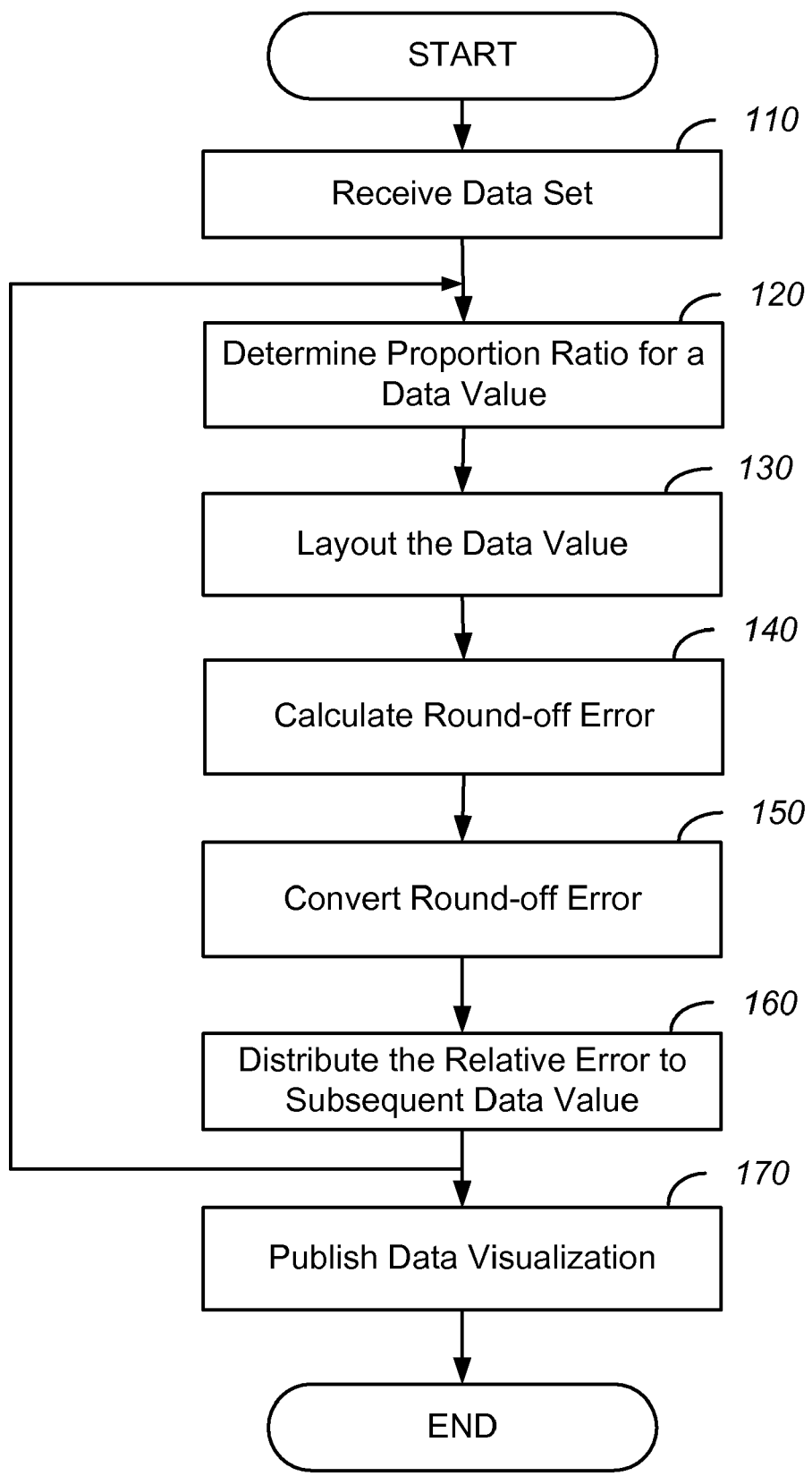
FIG. 1 is an exemplary process flow diagram which illustrates one method of rendering data visualizations with minimal round-off error.

FIG. 1 is an exemplary process flow diagram which illustrates one method of rendering data visualizations with minimal round-off error. At step 110, the system receives a dataset. In one embodiment, the dataset is stored on a data storage medium, such as a database. A developer may define one or more queries to be represented by the visual depiction. Moreover, a type of data visualization to be generated is selected. The queries are executed and the requested data is returned to the system. The data received is a range of values that will be represented using graphical elements, such as rectangles, and will be rendered in integer boundaries while minimizing the total error. Other shapes may also be used for graphical elements. In the simplest case other shapes may be implemented as images of arbitrary shapes, such as icons or other graphical elements with rectangular boundaries, which may be aligned along integer boundaries. In one embodiment, the dataset is sorted. At step 120, a proportion ratio is determined for a data value. The proportion ratio represents the ratio of a magnitude of the data value to a magnitude of all data values within the range, which, in one embodiment, may be computed by summing the data values in the range. While summation of data values is a typical method for aggregating data values to compute a linear proportion ratio, other aggregation methods are also possible, such as mean or maximum, which may be used to compute non-linear proportion ratios.

At step 130, a layout of the data value is performed. Layout is performed by mapping the data value to a fixed layout area where the magnitude of a cell characteristic corresponds to the proportion ratio. A cell represents the data value as a two-dimensional region of the fixed layout area. A characteristic may include area, color, gray value, texture, orientation, and length. It should be noted that other known characteristics may be applied to the methods described herein. For example in a treemap, the ratio of the area occupied by one rectangle to the total layout area is equivalent to the proportion ratio. Thus, in one embodiment, the area of each rectangle in the treemap is proportional to the magnitude of the corresponding data value. In an alternative embodiment, such as for a bar chart, a bar is positioned such that the height or length of the rectangle corresponds to the magnitude of the data value. It should be noted that various layout methods may be used in conjunction with the methods described herein.

When layout is performed on an environment which supports integer positions, fractional values are rendered using whole numbers. In one embodiment, casting the floating point value to a whole number is performed by clipping the fractional portion. A threshold may be used whereby the system rounds up to the next highest integer if the floating point value meets or exceeds the threshold and rounds down to the next lowest integer if the floating point value is less than the threshold. Mathematical functions, such as "Floor" and "Ceiling" functions may also be used to cast the floating point values to integer values.

At step 140, an error from the layout process is calculated. Round-off error is a byproduct, regardless of the casting method used. The round-off error may be calculated in many ways. For example, the error in a treemap can be determined by examining the positioning of the rectangular shape representing the data value, and more specifically, the positioning of the width and height of the rectangle. For example, a calculated error may be 0.25 pixels for a horizontal orientation. The error indicates that the width of the rectangle is off by 0.25 pixels. In one embodiment, the error indicates positive and negative values. The error is less than 1 unit of measurement where the system positions at integer values. In some cases, the error is 0 because the positioning rendered to integer values. For these cases, casting is not required and thus, round-off error is not present.

The error is converted into a coordinate space of the actual data values at step 150. In one embodiment, the error value is converted into the relative value of the actual data values retrieved from the database. For example, a calculated error 0.25 corresponds to the rectangular layout space of the treemap, whereas the data values are of a different coordinate space, such as a data type NUMBER. The error 0.25 in the layout space coordinate system may correspond with a value of 10 in the data type NUMBER coordinate system. The converted error is the relative value of the error in the layout space.

At step 160, the relative error is distributed to a subsequent data value. The subsequent data value, within the range of data values, has yet to be positioned. In one embodiment, the subsequent data value to be positioned is modified by adding the error originating from the previously positioned data value. For example, for a subsequent data value of 75, the converted error of value 10, is added, producing a subsequent data value of 85. In alternative embodiments, the round-off error from rendering a floating point to an integer position may be disbursed among multiple data values yet to be positioned. The error may be propagated regardless of directional orientation, such as horizontal or vertical orientation. In one embodiment, a single instance of error is carried over to the subsequent data value to be positioned. In alternative embodiments, multiple instances of error may be distributed.

In some cases, for example a distributed bar chart, the error from one data value should not be propagated to other data values. Instead, the error remains localized on the single data value. In other cases, error distribution is essential. The effects of error distribution are applicable to data visualizations with graphical elements in contiguous proximity. Graphical elements which are stacked next to each other would benefit from rounding error distribution because errors may be present at each level of the stack. The methods taught herein are particularly applicable to graphical representations including stacked bars, stacked area graphs, maps, and heat maps, for example. In one embodiment the graphical elements in contiguous proximity are limited to rectilinear shapes, diagonal shapes, or a combination of both.

This method reduces the accumulation of error on the last data values to be positioned by localizing the error. In one embodiment of a treemap, one rectangle may be larger than it should be if round-off error was not an issue. By localizing the error, the subsequent data value may account for the error by positioning a rectangle to be smaller than it should be if round-off error were not at issue. In this way, the error is a local error, which prevents the last data values to be positioned from being substantially error-prone.

The process may be iterative, looping back to step 120 for each data value to be positioned. In one embodiment, the layout algorithm iterates until all data values within the dataset have been placed. In the context of a treemap, the layout algorithm subdivides the parent nodes to incorporate the children nodes. In one embodiment, the direction for positioning alternates per subdivision level between horizontal and vertical positioning. Moreover, improvements may be made to minimize an aspect ratio of a rectangle by taking the maximum of width/height and height/width. This seeks to keep the positioned areas as square as possible. In terms of usability, it is easier for humans to compare areas of rectangles that are square in shape, rather than long, thin strips representing the data values.

At step 170, the data visualization is published. Once the report including the data visualization has been created with all the required data and visualization formatting, the data visualization may be published to enable the intended users to access the information easily. The data visualization information may be accessed in different formats. For example, the data visualization information may be output in PDF, HTML, HTML cascading style sheets (CSS), RTF, spreadsheet, as well as data-oriented formats such as XML and Delimited Data.

Where the data visualization information is accessed through the use of browsers, most browsers can only support rendering to integer positions. In an alternative embodiment, other modes of accessing the output information may also require rendering to be performed to integer positions. Rendering to thick clients requires significant overhead in order to properly render to non-integer positions. For example, rendering to Java swing components within a Java applet requires having a correct version of a Java run-time, including the correct Java interpreter, in the browser. Moreover, scalable vector graphics (SVG) is a plug-in that can render vectors at non-integer positions. Furthermore, most types of image processing programs, such as Photoshop®, Illustrator®, or Vector® graphics, render to non-integer positions but all require significant overhead.

Rendering to thin clients places fewer constraints on the end user. The data visualization may be rendered in an environment that can only position within integer boundaries. For example, HTML is limited to positioning rectangles at integer boundaries. The graphical elements of the data visualization may be rendered to HTML DIV elements without requiring the use of plug-ins or other overhead, such as a Java run-time or versioning issues.

Figure 2:
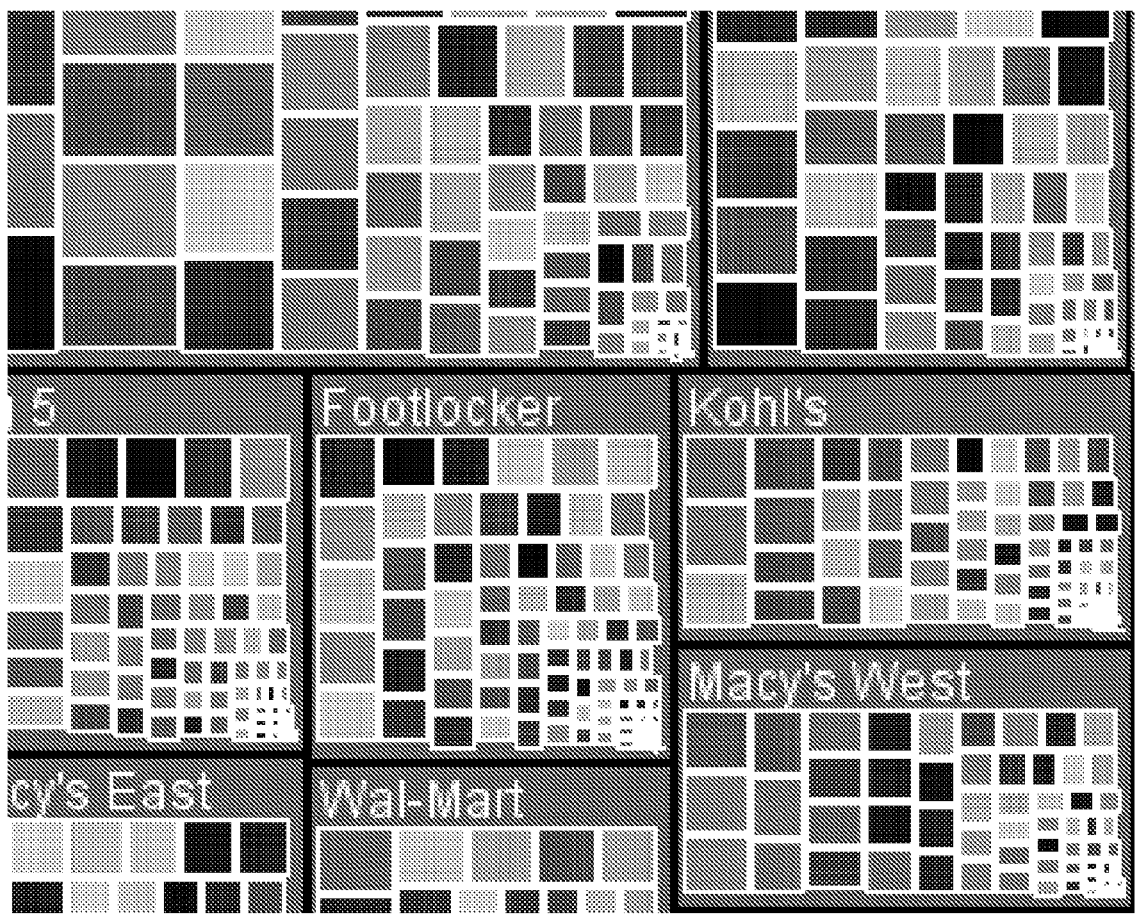
FIG. 2 is a diagrammatic representation of a dataset visualized in the form of a treemap where the positioning of the data values produces accumulation of rounding error.

FIG. 2 is a diagrammatic representation of a dataset visualized in the form of a treemap where the positioning of the data values produces accumulation of rounding error. In this example, the area characteristic conveys the magnitude of the data value and the grayscale color characteristic conveys the magnitude of another data value. The areas of the rectangles displayed conveys a quantity of product sold and the grayscale color indicates a type of product. As shown, the rectangles with floating point coordinates have been positioned at integer boundaries. Although the errors in the widths and heights of each rectangle are not obvious because the individual errors themselves are less than one pixel, the positioning produces severe error accumulation in the bottom right corner of the treemap. Here, the errors accumulate from left to right and from top to bottom, such that the right-most and bottom-most edge of each group are not aligned.

Figure 3:
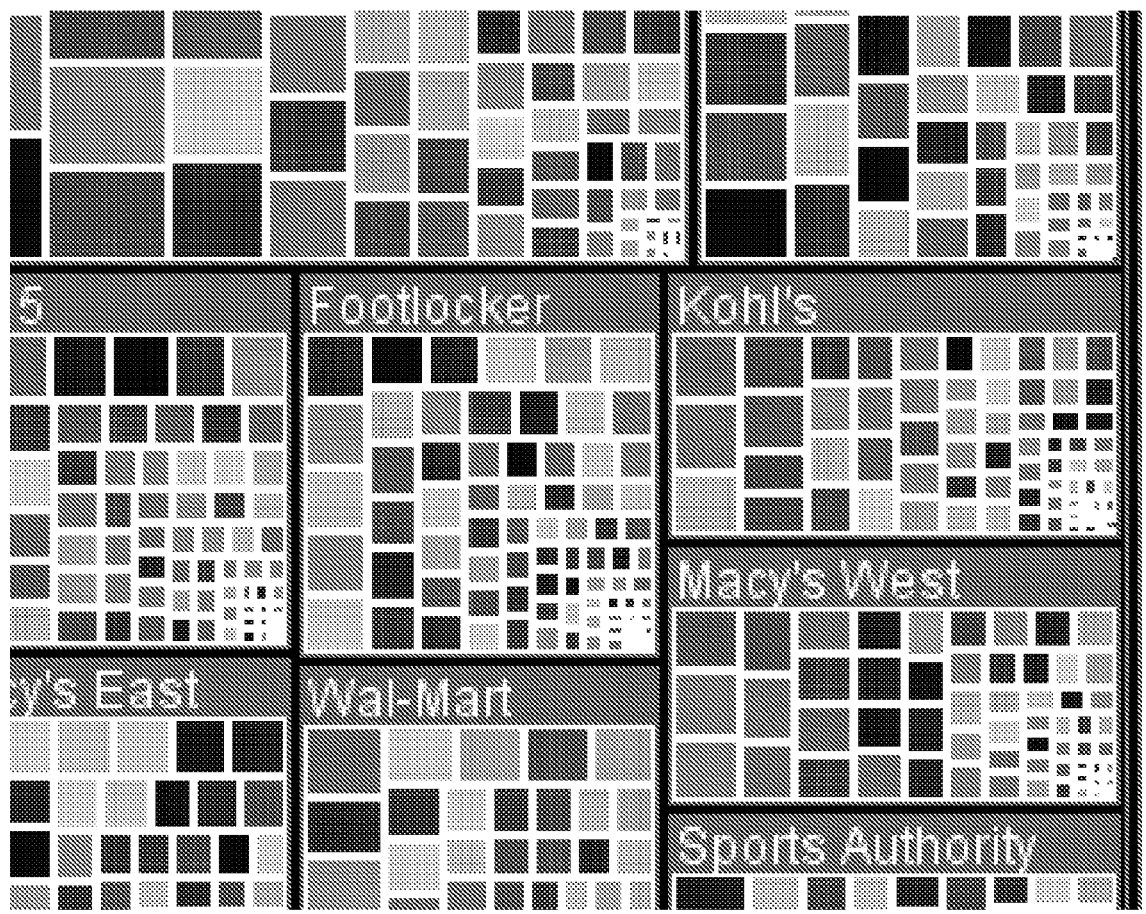
FIG. 3 is a diagrammatic representation of a dataset visualized in the form of a treemap where data values are positioned to localize rounding error.

FIG. 3 is a diagrammatic representation of a dataset visualized in the form of a treemap where data values are positioned to localize rounding error. As shown, the rectangles with floating point coordinates have been positioned at integer boundaries using the technique to minimize rounding error by distributing the error locally. By localizing error, the error accumulation is effectively diminished. Here, the right-most and bottom-most edges of each group are aligned.

More specifically, the conversion of the fractional coordinate into a whole number causes rounding error, producing a positive or negative rounding error less than one. For example, during layout of a data value, the system may determine the position of the data value to be 1.75. To render at an integer position, the system may cast to the next highest integer, drawing a graphical line at 2. The error is calculated to be 0.25. The system distributes this error locally instead of allowing the error to accumulate to the last values to be positioned at integer boundaries.

An HTML DIV rendering algorithm thus can produce data visualizations, such as shown in this figure, capable of illustrating the same kind of information from the given dataset as more complex rendering systems. In one embodiment, the rectangles can be sized and filtered to change the layout in addition to other functionalities.

Figure 4:
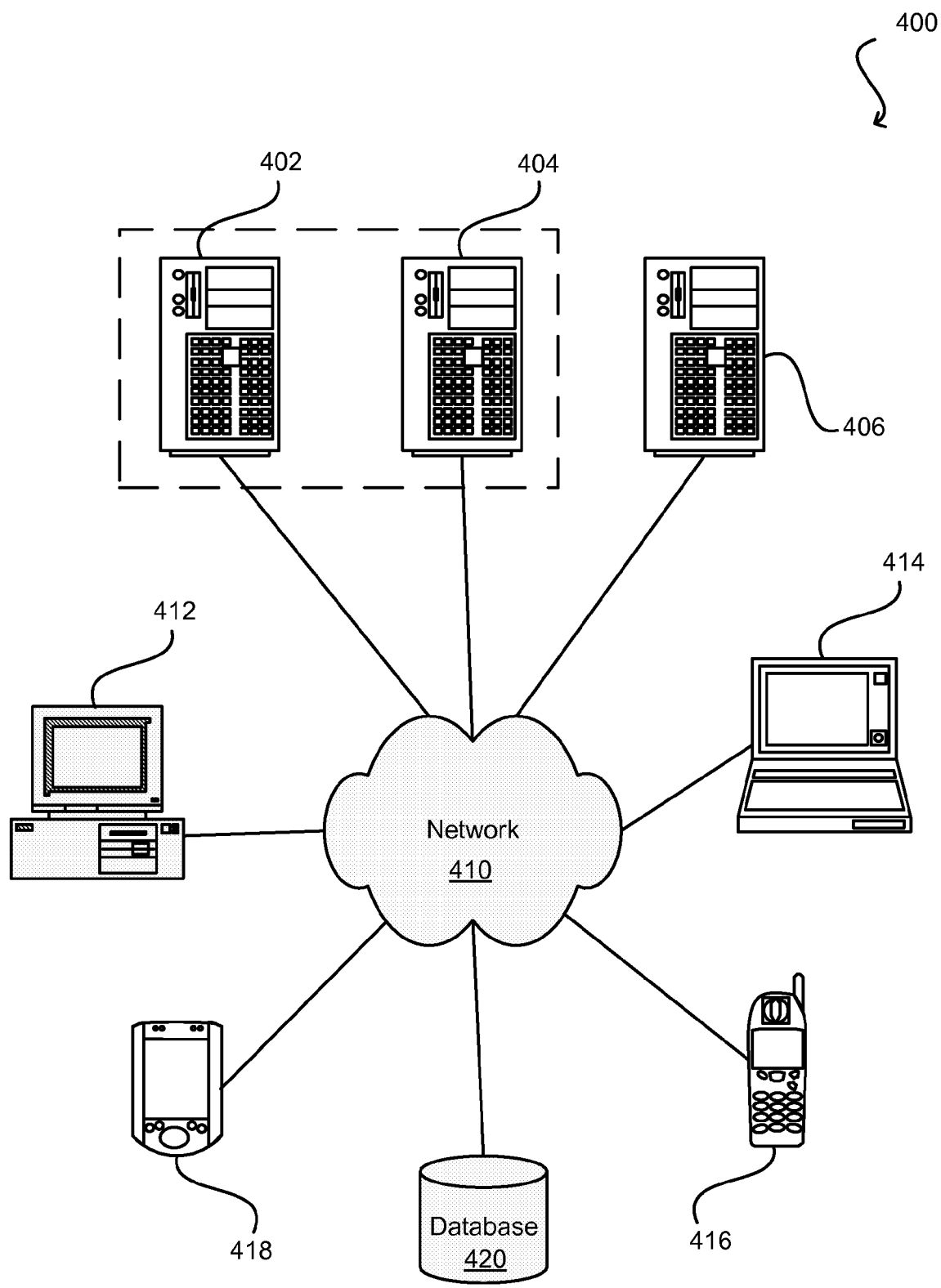
FIG. 4 is a block diagram illustrating components of an exemplary operating environment in which various embodiments of the present invention may be implemented.

FIG. 4 is a block diagram illustrating components of an exemplary operating environment in which various embodiments of the present invention may be implemented. The system 400 can include one or more user computers, computing devices, or processing devices 412, 414, 416, 418, which can be used to operate a client, such as a dedicated application, web browser, etc. The user computers 412, 414, 416, 418 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 412, 414, 416, 418 may also have any of a variety of applications, including one or more development systems, database client and/or server applications, and Web browser applications. Alternatively, the user computers 412, 414, 416, 418 may be any other electronic device, such as a thin-client computer, Internet-enabled gaming system, and/or personal messaging device, capable of communicating via a network (e.g., the network 410 described below) and/or displaying and navigating Web pages or other types of electronic documents. Although the exemplary system 400 is shown with four user computers, any number of user computers may be supported.

In most embodiments, the system 400 includes some type of network 410. The network may can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 402, 404, 406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 406) may be dedicated to running applications, such as a business application, a Web server, application server, etc. Such servers may be used to process requests from user computers 412, 414, 416, 418. The applications can also include any number of applications for controlling access to resources of the servers 402, 404, 406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 412, 414, 416, 418. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 412, 414, 416, 418.

The system 400 may also include one or more databases 420. The database(s) 420 may reside in a variety of locations. By way of example, a database 420 may reside on a storage medium local to (and/or resident in) one or more of the computers 402, 404, 406, 412, 414, 416, 418. Alternatively, it may be remote from any or all of the computers 402, 404, 406, 412, 414, 416, 418, and/or in communication (e.g., via the network 410) with one or more of these. In a particular set of embodiments, the database 420 may reside in a storage-area network ("SAN") familiar to those skilled in the art. Similarly, any necessary files for performing the functions attributed to the computers 402, 404, 406, 412, 414, 416, 418 may be stored locally on the respective computer and/or remotely, as appropriate. In one set of embodiments, the database 420 may be a relational database, such as Oracle 10g, that is adapted to store, update, and retrieve data in response to SQL-formatted commands.

Figure 5:
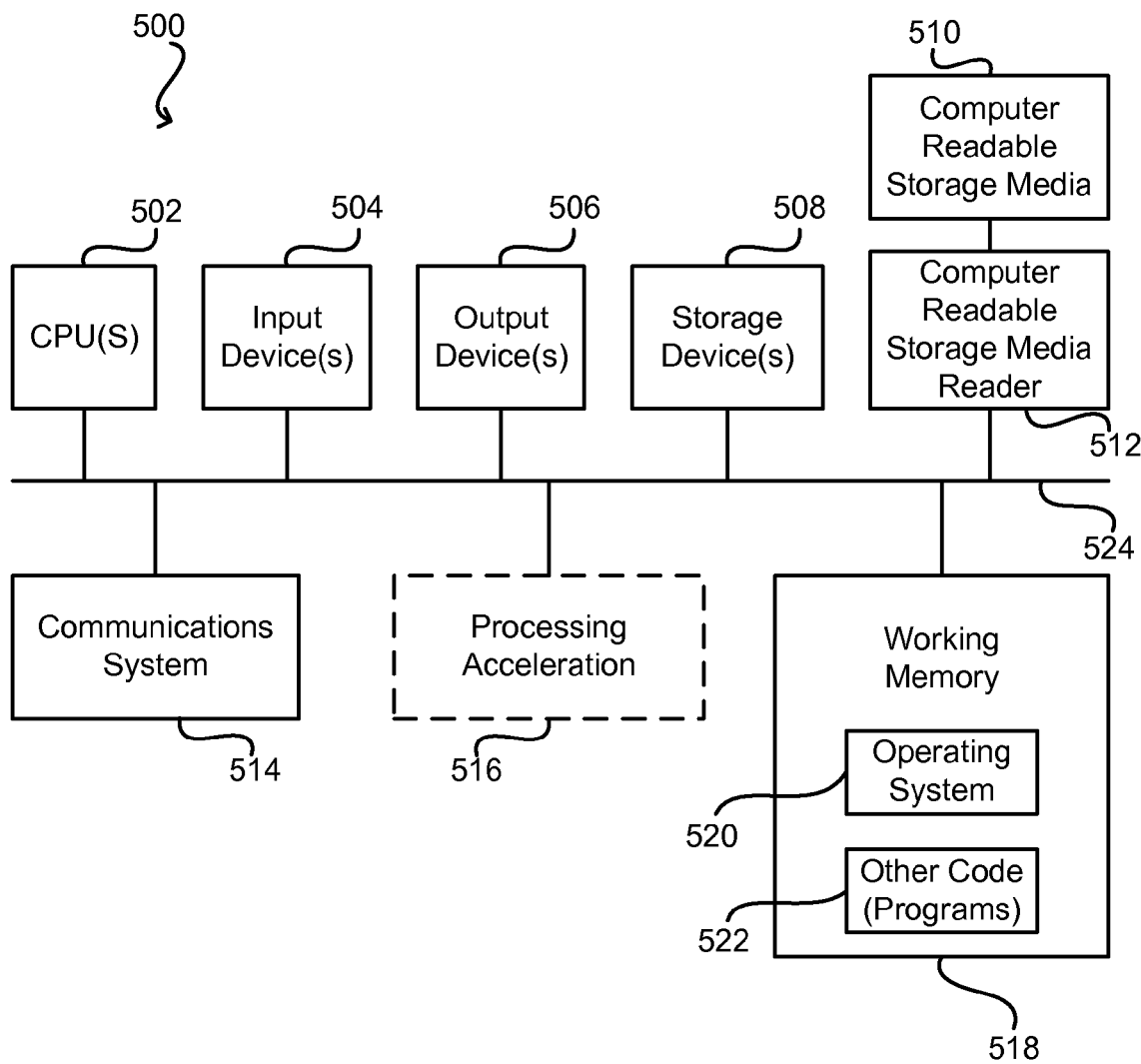
FIG. 5 illustrates an exemplary computer system in which various embodiments of the present invention may be implemented.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. The scope of the invention should, therefore, be determined not with reference to the above description, but instead should be determined with reference to the pending claims along with their full scope or equivalents.

What is claimed is:

1. A data visualization method for representing a dataset as graphical elements within a graphical layout area, the method comprising:
   receiving, at one or more computer systems, information specifying layout of a multi-dimensional graphical element representing a data value of the dataset on the graphical layout area;
   determining, with one or more processors associated with the one or more computer systems, a floating point position of each of a plurality of dimensions of the multi-dimensional graphical element representing the data value on the graphical layout area;
   determining, with the one or more processors associated with the one or more computer systems, a round-off error for each of the plurality of dimensions of the multi-dimensional graphical element representing the data value based on casting the floating point position of each of the plurality of dimensions to an integer position on the graphical layout area; and
   generating, with the one or more processors associated with the one or more computer systems, information distributing the round-off error for each of the plurality of dimensions of the multi-dimensional graphical element representing the data value among a plurality of multi-dimensional graphical elements representing a subsequent set of data values of the dataset yet to be positioned on the graphical layout area.

2. The method of claim 1, wherein receiving the information specifying layout of the multi-dimensional graphical element representing the data value further comprises:
   determining a proportion ratio of the data value representing magnitude of the data value relative to a total magnitude of all data values in the dataset; and
   determining each of the plurality of dimensions of the multi-dimensional graphical element representing the data value based on the proportion ratio.

3. The method of claim 2, wherein determining the floating point position of each of the plurality of dimensions of the multi-dimensional graphical element representing the data value further comprises determining each floating point position based on the proportion ratio.

4. The method of claim 1, further comprising:
   receiving the dataset from a data store; and
   generating an ordering for the data set based on sorting each data value in the dataset.

5. The method of claim 1, wherein generating the information distributing the round-off error for each of the plurality of dimensions of the multi-dimensional graphical element representing the data value among the plurality of multi-dimensional graphical elements representing the subsequent set of data values of the dataset yet to be positioned on the graphical layout area comprises:
   converting the round-off error for each of the plurality of dimensions from a first value of a first coordinate space of the graphical layout into a relative second value of a second coordinate space of the data value, the first coordinate space being different from the second coordinate space.

6. The method of claim 5, further comprising:
   modifying the subsequent set of data values to include the converted round-off error of the data value.

7. The method of claim 1, wherein generating the information distributing the round-off error for each of the plurality of dimensions of the multi-dimensional graphical element representing the data value among the plurality of multi-dimensional graphical elements representing the subsequent set of data values of the dataset yet to be positioned on the graphical layout area further includes:
   modifying a plurality of multi-dimensional graphical elements representing the subsequent set of data values to each include a portion of the round-off error of each of the plurality of dimensions of the multi-dimensional graphical element representing the data value.

8. The method of claim 1, wherein one or more of the graphical elements are in contiguous proximity to another one of the graphical elements.

9. The method of claim 8, wherein the graphical elements are rectilinear in shape.

10. The method of claim 1, wherein the graphical layout area is within an HTML browser.

11. A non-transitory computer-readable medium storing computer-executable code for representing a dataset as graphical elements within a graphical layout area, the computer-readable medium comprising:
   code for receiving information specifying layout of a multi-dimensional graphical element representing a data value of the dataset on the graphical layout area;
   code for determining a floating point position of each of a plurality of dimensions of the multi-dimensional graphical element representing the data value on the graphical layout area;
   code for determining a round-off error for each of the plurality of dimensions of the multi-dimensional graphical element representing the data value based on casting the floating point position of each of the plurality of dimensions to an integer position on the graphical layout area; and code for generating information distributing the round-off error for each of the plurality of dimensions of the multi-dimensional graphical element representing the data value among a plurality of multi-dimensional graphical elements representing a subsequent set of data values of the dataset yet to be positioned on the graphical layout area.

12. The computer-readable medium according to claim 11, wherein the code for generating the information distributing the round-off error for each of the plurality of dimensions of the multi-dimensional graphical element representing the data value among the plurality of multi-dimensional graphical elements representing the subsequent set of data values of the dataset yet to be positioned on the graphical layout area further includes:

code for converting the round-off error for each of the plurality of dimensions from a first value of a first coordinate space of the graphical layout into a relative second value of a second coordinate space of the data value, the first coordinate space being different from the second coordinate space; and code for modifying the subsequent set of data values to include the converted round-off error of the data value.

13. The computer-readable medium according to claim 11, wherein the code for generating the information distributing the round-off error for each of the plurality of dimensions of the multi-dimensional graphical element representing the data value to another multi-dimensional graphical element representing a subsequent data value among the plurality of multi-dimensional graphical elements representing the subsequent set of data values of the dataset yet to be positioned on the graphical layout area further includes:

code for modifying a plurality of multi-dimensional graphical elements representing the subsequent set of data values to each include a portion of the round-off error of each of the plurality of dimensions of the multi-dimensional graphical element representing the data value.

14. The computer-readable medium according to claim 11, wherein one or more of the graphical elements are in contiguous proximity to another one of the graphical elements.

15. The computer-readable medium according to claim 14, wherein the graphical elements are rectilinear in shape.

16. A system for representing a dataset as graphical elements within a graphical layout area, the system comprising:

a processor; and a memory coupled to the processor, the memory configured to store a plurality of code modules which when executed by the processor cause the processor to:

receive information specifying layout of a multi-dimensional graphical element representing a data value of the dataset on the graphical layout area;

determine a floating point position of each of a plurality of dimensions of the multi-dimensional graphical element representing the data value on the graphical layout area;

determine a round-off error for each of the plurality of dimensions of the multi-dimensional graphical element representing the data value based on casting the floating point position of each of the plurality of dimensions to an integer position on the graphical layout area; and generate information distributing the round-off error for each of the plurality of dimensions of the multi-dimensional graphical element representing the data value among a plurality of multi-dimensional graphical elements representing a subsequent set of data values of the dataset yet to be positioned on the graphical layout area.

17. The system of claim 16, wherein in generating the information distributing the round-off error for each of the plurality of dimensions of the multi-dimensional graphical element representing the data value among the plurality of multi-dimensional graphical elements representing the subsequent set of data values of the dataset yet to be positioned on the graphical layout area the processor is further caused to:

convert the round-off error for each of the plurality of dimensions from a first value of a first coordinate space of the graphical layout into a relative second value of a second coordinate space of the data value, the first coordinate space being different from the second coordinate space; and modify the subsequent set of data values to include the converted round-off error of the data value.

18. The system of claim 16, wherein in generating the information distributing the round-off error for each of the plurality of dimensions of the multi-dimensional graphical element representing the data value among the plurality of multi-dimensional graphical element elements representing the subsequent set of data value values of the dataset yet to be positioned on the graphical layout area the processor is further caused to:

modifying a plurality of multi-dimensional graphical elements representing the subsequent set of data values to each include a portion of the round-off error of each of the plurality of dimensions of the multi-dimensional graphical element representing the data value.

19. The system of claim 16, wherein one or more of the graphical elements are in contiguous proximity to another one of the graphical elements.

20. The system of claim 19, wherein the graphical elements are rectilinear in shape.

\* \* \* \* \*

UNITED STATES PATENT AND TRADEMARK OFFICE
CERTIFICATE OF CORRECTION

| | | |
|---|---|---|
| PATENT NO. | : 8,139,063 B2 | Page 1 of 1 |
| APPLICATION NO. | : 11/745280 | |
| DATED | : March 20, 2012 | |
| INVENTOR(S) | : Helfman et al. | |

It is certified that error appears in the above-identified patent and that said Letters Patent is hereby corrected as shown below:

In column 1, line 11-12, after "GENERATION";" insert -- and --.

In column 1, line 14, delete ""AGGREGATE LAYOUT FOR DATA" and insert -- "DATA --, therefor.

In column 1, line 15, delete "TECHNIQUES";" and insert -- TECHNIQUES". --, therefor.

In column 12, line 37, in Claim 18, before "elements" delete "element".

In column 12, line 38, in Claim 18, after "data" delete "value".

Signed and Sealed this
Fifth Day of June, 2012

David J. Kappos
*Director of the United States Patent and Trademark Office*